(12) United States Patent
Ozawa

(10) Patent No.: US 6,524,150 B2
(45) Date of Patent: *Feb. 25, 2003

(54) EXHAUST EMISSION CONTROL FOR WATERCRAFT

(75) Inventor: Shigeyuki Ozawa, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,965

(22) Filed: May 17, 2001

(65) Prior Publication Data

US 2002/0106947 A1 Aug. 8, 2002

Related U.S. Application Data

(63) Continuation of application No. 08/842,689, filed on Apr. 15, 1997, now Pat. No. 6,250,976.

(30) Foreign Application Priority Data

Apr. 15, 1996 (JP) .............................................. 8-092601

(51) Int. Cl.⁷ .............................................. B63H 21/32
(52) U.S. Cl. ....................................................... 440/89
(58) Field of Search .......................... 440/1, 2, 88, 89; 123/676, 679, 689, 41.13, 41.15

(56) References Cited

U.S. PATENT DOCUMENTS

| | | |
|---|---|---|
| 3,739,366 A | 6/1973 | Lace |
| 4,019,489 A | 4/1977 | Cartmill |
| 4,598,278 A | 7/1986 | Ford |
| 4,615,303 A | 10/1986 | Sackett |
| 5,016,006 A | 5/1991 | Umehara |
| 5,076,190 A | 12/1991 | Iikawa |
| 5,136,279 A | 8/1992 | Kanno |
| 5,201,284 A | 4/1993 | Umehara |
| 5,360,081 A | 11/1994 | Takegami |
| 5,433,634 A | 7/1995 | Nakayama et al. |
| 5,554,057 A | 9/1996 | Abe et al. |
| 5,788,547 A | 8/1998 | Ozawa et al. |
| 5,797,775 A | 8/1998 | Ozawa et al. |
| 5,911,609 A * | 6/1999 | Fujimoto et al. .............. 440/89 |
| 5,954,553 A | 9/1999 | Ozawa et al. |
| 6,250,976 B1 * | 6/2001 | Ozawa .......................... 440/1 |

* cited by examiner

Primary Examiner—Ed Swinehart
(74) Attorney, Agent, or Firm—Knobbe, Martens, Olson & Bear, LLP

(57) ABSTRACT

A watercraft includes a monitoring and control system to sense the operational state of a catalytic device and a cooling system used with an exhaust system of the watercraft. The monitoring and control system receives temperature reading from an exhaust system temperature sensor. The sensor desirably is located in a portion of the exhaust system which the cooling system cools. The monitor and control system activates a first level warning indicators if the sensed temperature of the exhaust system exceeds a preselected first warning temperature. And if the sensed temperature exceeds a presented second warning temperature, the monitoring and control system reduces engine speed and eventually stops the engine. The monitor and control system also communicate with an exhaust gas temperature sensor which is located in the vicinity of a catalytic device of the exhaust system. If the sensed temperature is within a desired temperature range, the control system activates a system-ready indicator. If, however, the sensed temperature exceeds the desired temperature range, the control system activates warning indicators.

15 Claims, 11 Drawing Sheets

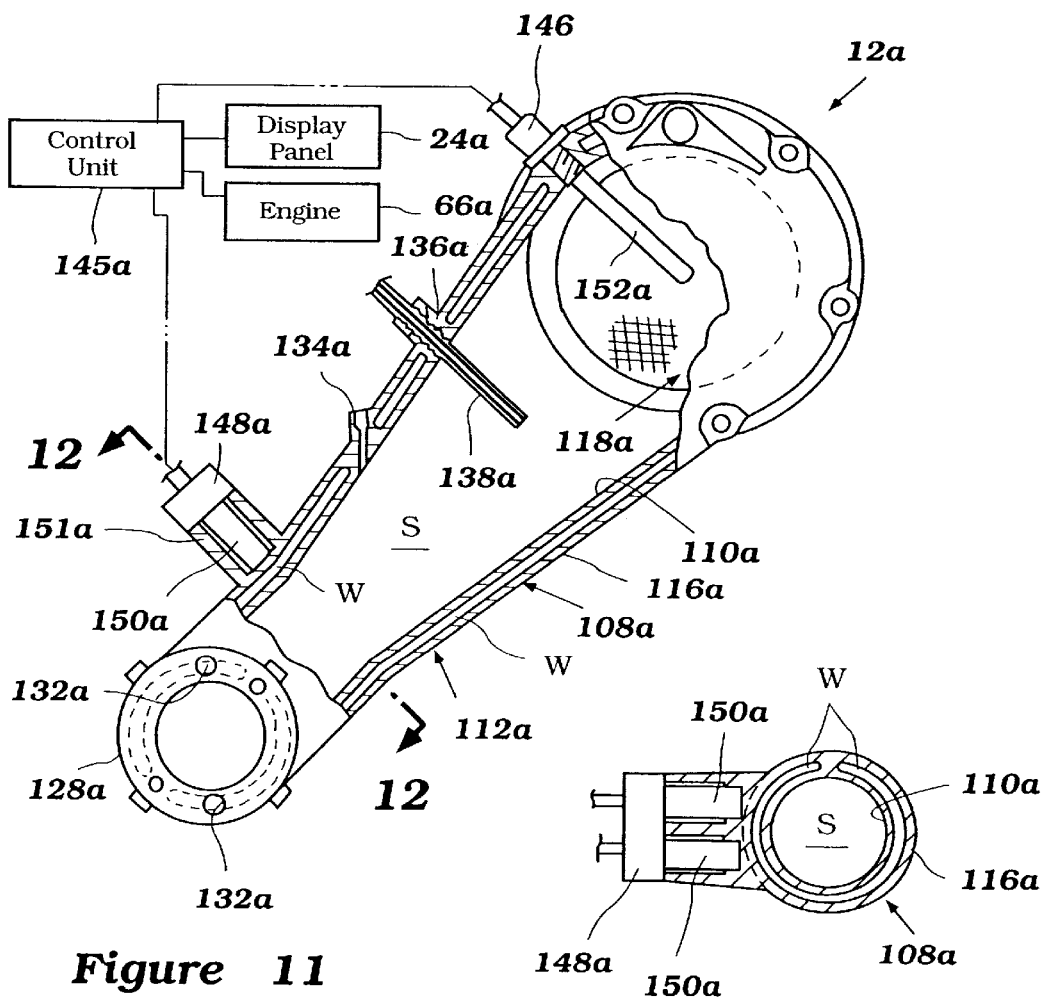
Figure 11
Figure 12
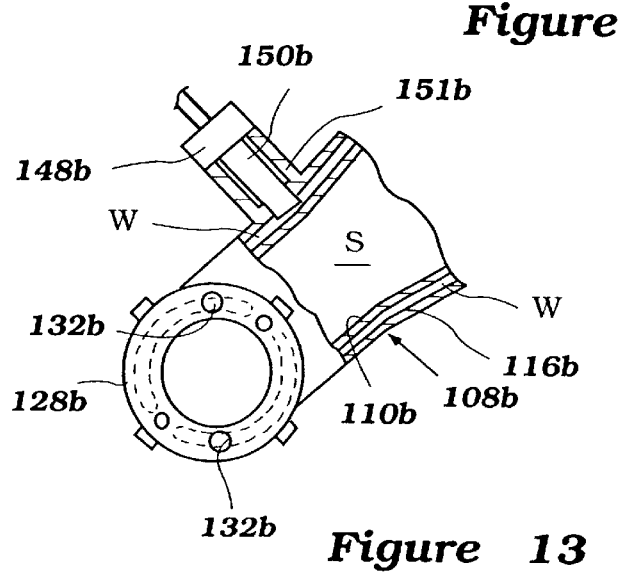
Figure 13

EXHAUST EMISSION CONTROL FOR WATERCRAFT

RELATED APPLICATIONS

This application is a continuation of U.S. patent application Ser. No. 08/842,689, filed on Apr. 15, 1997 and issued as U.S. Pat. No. 6,250,976 on Jun. 26, 2001, which claimed the priority benefit under 35 U.S.C. § 119 of Japanese Application No. HEI 08-092,601, which was filed on Apr. 15, 1996.

BACKGROUND OF THE INVENTION

1. Field of the Invention

The present invention relates to an exhaust system for a watercraft, and more particularly to a monitoring and control system for a catalytic exhaust system of a watercraft.

2. Description of Related Art

Personal watercraft have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to minimize exhaustion of hydrocarbons and other exhaust byproducts (e.g., carbon monoxide and oxides of nitrogen), and thus reduce pollution of the atmosphere and the body of water in which the watercraft is operated. In response to the increased concerns regarding exhaust emissions, some personal watercraft engines recently have become equipped with a catalyst to convert exhaust byproducts to harmless gases.

Catalysts must operate at a relatively high temperature in order to produce the necessary thermal reaction and burning of the exhaust byproducts. A catalytic device thus desirably operates within a specific range of temperature so as to effectively and efficiently convert engine exhaust into generally harmless gases.

Some prior exhaust systems have employed a cooling jacket about the catalytic device to maintain the catalytic device within the desired temperature range. In some systems, at least a portion of the cooling water also is introduced into the exhaust system to not only further cool and silence the exhaust gases, but also to assist the discharge of exhaust gases. The added water to the exhaust system, however, gives rise to possible damage to the catalyst.

SUMMARY OF THE INVENTION

A need therefore exists for a system to monitor the operational conditions of the catalytic device and the exhaust system and to control an indicator panel, as well as the engine, in response to the sensed operational conditions One aspect of the present invention involves a watercraft comprising an internal combustion engine having at least one exhaust port. An output shaft of the engine drive a propulsion device to propel the watercraft. An exhaust system includes an exhaust passage that extends between the engine exhaust port and a discharge port. A catalytic device treats exhaust gases from the engine before discharge through the discharge port, and a cooling jacket extends along a portion of the exhaust system in the vicinity of the catalytic device. An exhaust system temperature sensor is arranged to lie adjacent to at least a passage of the cooling jacket. In this position, the temperature sensor obtains accurate readings of the portion of the exhaust system which is cooled by the cooling jacket.

Another aspect of the present invention involves a watercraft comprising an internal combustion engine having at least one exhaust port. An exhaust system includes an exhaust passage that extends between the engine exhaust port and a discharge port. A cooling system includes a cooling jacket that extending along a portion of the exhaust system. A sensor is used to determine an operating characteristic of the exhaust system which is indicative of the operational condition of the cooling system and communicates this characteristic to a control system. The control system in turn operates the engine depending upon the operational condition of the cooling system.

An additional aspect of the invention involves a control method for preventing excess heat in a watercraft. The method involves sensing a characteristic of an exhaust system of the watercraft which is indicative of the operational state of a cooling system, and comparing the sensed characteristic against a first characteristic datum to determine whether the sensed characteristic falls outside the first characteristic datum. The first characteristic datum is preselected to define a first warning state. A warning indicator is activated if the sensed characteristic falls outside the first characteristic datum. The method also involves comparing the sensed characteristic against a second characteristic datum to determine whether the sensed characteristic falls outside the second characteristic datum. The second characteristic datum is preselected to define a second warning state. The speed of the engine is reduced if the sensed characteristic fall outside the second characteristic datum.

Further aspects, features, and advantages of the present invention will become apparent from the detailed description of the preferred embodiments which follows.

BRIEF DESCRIPTION OF THE DRAWINGS

The above-mentioned and other features of the invention will now be described with reference to the drawings of preferred embodiments of the present watercraft exhaust system. The illustrated embodiments of the watercraft exhaust system are intended to illustrate, but not to limit the invention. The drawings contain the following figures:

FIG. 11 is a rear, partial sectional view of an another sensory system arrangement that can be used with the present exhaust system;

FIG. 12 is a cross-sectional view of the temperature sensor arrangement of FIG. 11 taken along line 12—12;

FIG. 13 is an additional temperature sensor arrangement of the sensory system;

DETAILED DESCRIPTION OF PREFERRED EMBODIMENTS

Several embodiments of a control and monitoring system for an engine exhaust system are disclosed herein. Each of these embodiments employ the same basic concepts of monitoring the operating condition of a catalytic device and a cooling system used with the exhaust system, activating a warning indicator when a first abnormal condition is sensed, and stopping the engine when the abnormal operating condition worsens.

Figure 1:
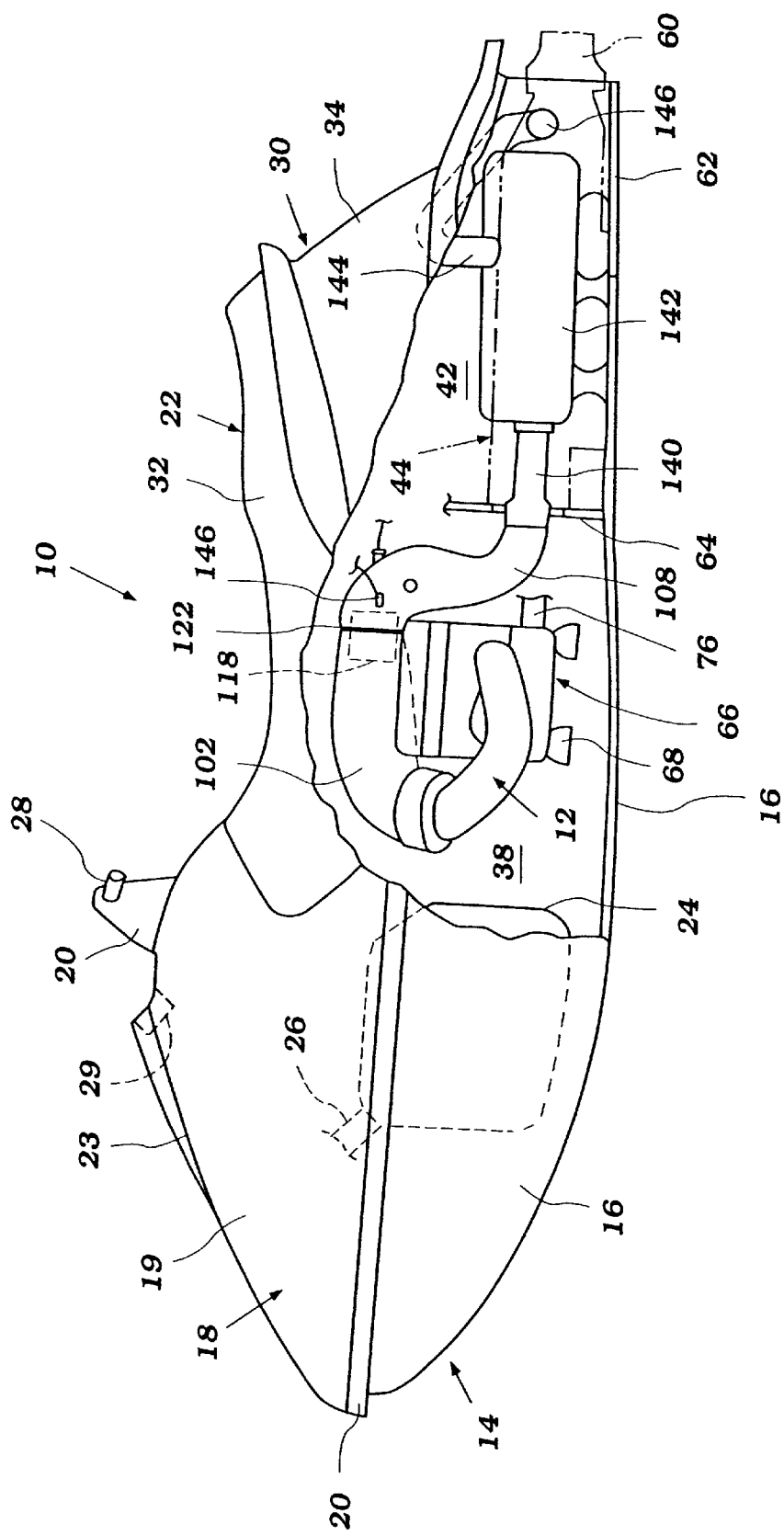
FIG. 1 is a partial sectional, side elevational view of a personal watercraft including an exhaust system configured in accordance with a preferred embodiment of the present invention.
Figure 2:
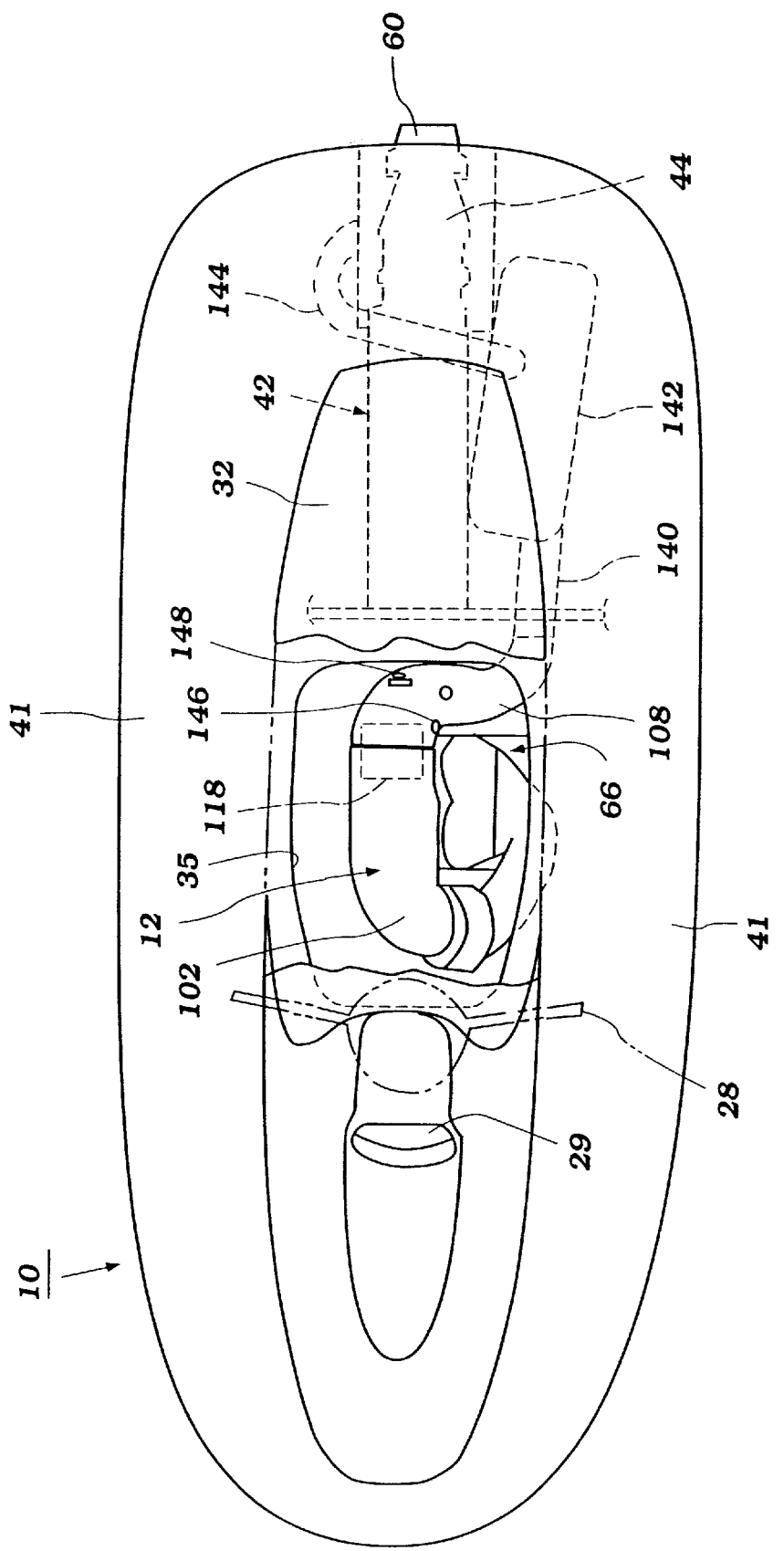
FIG. 2 is a partial sectional, top plan view of the personal watercraft of FIG. 1.

FIGS. 1 and 2 illustrate a personal watercraft 10 which includes an exhaust system 12 configured in accordance with a preferred embodiment of the present invention. Although the present exhaust system 12 is illustrated in connection with a personal watercraft, the catalytic exhaust system can be used with other types of watercraft as well, such as, for example, but without limitation, small jet boats and the like. Before describing the exhaust system 12, an exemplary personal watercraft 10 will first be described in general details to assist the reader's understanding of the environment of use and the operation of the exhaust system 12.

The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

As viewed in the direction from the bow to the stem of the watercraft, the upper deck section 18 includes a bow portion 19, a control mast 20 and a rider's area 22. The bow portion 19 slopes upwardly toward the control mast 20 and includes at least one air duct through which air can enter the hull. A cover 23 desirably extends above an upper end of the air duct to inhibit an influx of water into the hull.

A fuel tank 24 is located within the hull 14 beneath the cover 23. Conventional means, such as, for example, straps, secure the fuel tank 24 to the lower hull 16. A fuel filler hose 26 extends between a fuel cap assembly and the fuel tank 24. In the illustrated embodiment, the filler cap assembly (not shown) is secured to the bow portion 19 of the hull upper deck 18 to the side and in front of the control mast 20. In this manner, the fuel tank can be filled from outside the hull 14 with the fuel passing through the fuel filler hose 26 into the tank 24.

The control mast 20 extends upward from the bow portion 19 and supports a handlebar assembly 28. The handlebar 28 controls the steering of the watercraft 10 in a conventional manner. The handlebar assembly 28 also carries a variety of controls of the watercraft 10, such as, for example, a throttle control, a start switch and a lanyard switch.

A display panel 29 desirably is located in front of the control mast 20 on the bow portion 19 and is orientated to be visible by the rider. The display panel desirably displays a number of performance characteristics of the watercraft such as for example, watercraft speed (via a speedometer), engine speed (via a tachometer), fuel level, oil level, engine temperature, battery charge level and the like. The display panel 29 also desirably includes at least two indicator lamps: a green LED (light emitting diode) and a red LED. The purpose of these indicate lights will be explained below.

The rider's area 22 lies behind the control mast 20 and includes a seat assembly 30. In the illustrated embodiment, the seat assembly 30 has a longitudinally extending straddle-type shape that may be straddled by an operator and by at least one or two passengers. The seat assembly 30, at least in principal part, is formed by a seat cushion 32 supported by a raised pedestal 34. The raised pedestal 34 has an elongated shape and extends longitudinally along the center of the watercraft 10. The seat cushion 32 desirably is removably attached to a top surface of the pedestal 34 and covers the entire upper end of the pedestal for rider and passenger comfort.

An access opening 35 is located on an upper surface of the pedestal 34. The access opening 35 opens into an engine compartment 38 formed within the hull 14. The seat cushion 32 normally covers and seals closed the access opening 35. When the seat cushion 32 is removed, the engine compartment 38 is accessible through the access opening 35.

The pedestal 34 also desirably includes at least one air duct located behind the access opening. The air duct communicates with the atmosphere through a space between the pedestal 34 and the cushion 32 which is formed behind the access opening. Air passes through the rear duct in both directions.

The upper deck section 18 of the hull 12 advantageously includes a pair of raised gunnels 39 (FIG. 3) positioned on opposite sides of the aft end of the upper deck assembly 18. The raised gunnels 39 define a pair of foot areas 41 that extend generally longitudinally and parallel to the sides of the pedestal 34. In this position, the operator and any passengers sitting on the seat assembly 30 can place their feet in the foot areas 41 with the raised gunnels shielding the feet and lower legs of the riders. A non-slip (e.g., rubber) mat desirably covers the foot areas 41 to provide increased grip and traction for the operator and the passengers.

The lower hull portion 16 principally defines the engine compartment 38. Except for the air ducts, the engine compartment 38 is normally substantially sealed so as to enclose an engine of the watercraft 10 from the body of water in which the watercraft is operated.

The lower hull 16 is designed such that the watercraft 10 planes or rides on a minimum surface area at the aft end of the lower hull 16 in order to optimize the speed and handling of the watercraft 10 when up on plane. For this purpose, the lower hull section generally has a V-shaped configuration formed by a pair of inclined section that extend outwardly from a keel line of the hull to the hull's side walls at a dead rise angle. The inclined sections also extend longitudinally from the bow toward the transom of the lower hull 14. The side walls are generally flat and straight near the stem of the lower hull and smoothly blend towards the longitudinal center of the watercraft at the bow. The lines of intersection between the inclined section and the corresponding side wall form the outer chines of the lower hull section.

Toward the transom of the watercraft, the incline sections of the lower hull 16 extend outwardly from a recessed channel or tunnel 42 that extends upward toward the upper deck portion 16. The tunnel 42 has a generally parallelepiped shape and opens through the rear of the transom 43 of the watercraft 10, as seen in FIG. 1.

In the illustrated embodiment, a jet pump unit 44 propels the watercraft 10. The jet pump unit 44 is mounted within the tunnel 42 formed on the underside of the lower hull section 16 by a plurality of bolt. An intake duct of the jet pump unit 44 defines an inlet opening that opens into a gullet. The gullet leads to an impeller housing assembly in which the impeller of the jet pump 44 operates. An impeller housing assembly also acts as a pressurization chamber and delivers the water flow from the impeller housing to a discharge nozzle housing.

A steering nozzle 60 is supported at the downstream end of the discharge nozzle by a pair of vertically extending pivot pins. In an exemplary embodiment, the steering nozzle 60 has an integral lever on one side that is coupled to the handlebar assembly 28 through, for example, a bowden-wire actuator, as known in the art. In this manner, the operator of the watercraft can move the steering nozzle 60 to effect directional changes of the watercraft 10.

A ride plate 62 covers a portion of the tunnel 42 behind the inlet opening to enclose the pump assembly and the nozzle assembly 60 of the propulsion unit 44 within the tunnel 42. In this manner, the lower opening of the tunnel 42 is closed to provide a planing surface for the watercraft 10.

An impeller shaft supports the impeller within the impeller housing of the unit 44. The aft end of the impeller shaft is suitable supported and journalled within the compression chamber of the assembly in a known manner. The impeller shaft extends in the forward direction through a front wall or bulkhead 64 of the tunnel 42.

An internal combustion engine 66 of the watercraft powers the impeller shaft to drive the impeller of the jet pump unit 44. The engine 66 is positioned within the engine compartment 38 and is mounted primarily beneath the control mast 20. Vibration absorbing engine mounts 68 secure the engine 66 to the lower hull portion 16 in a known manner. The engine 66 is mounted in approximately a central position in the watercraft 10.

In the illustrated embodiment, the engine 66 includes two in-line cylinders and operates on a two-stroke, crankcase compression principle. The engine 66 is positioned such that the row of cylinders lies parallel to a longitudinal axis of the watercraft 10, running from bow to stem. The axis of each cylinder is skewed or inclined relative to a vertical central plane of the watercraft 10, in which the longitudinal axis lies. This engine type, however, is merely exemplary. Those skilled in the art will readily appreciate that the present fuel delivery system can be used with any of a variety of engine types having other number of cylinders, having other cylinder arrangements and operating on other combustion principles (e.g., four-stroke principle).

Figure 3:
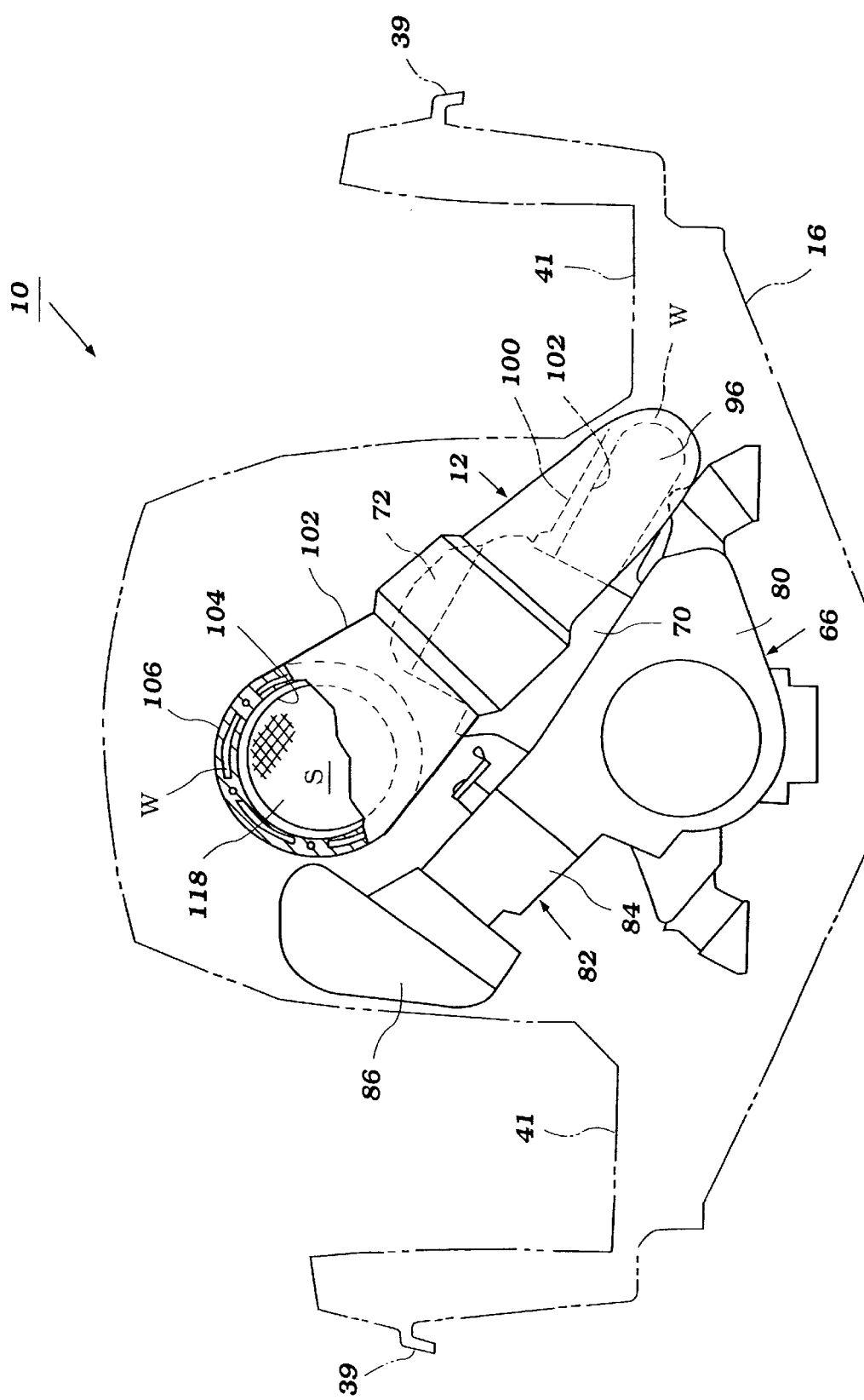
FIG. 3 is a partial sectional, front elevational view of an engine of the watercraft of FIG. 1 and illustrates a cross-section of a surrounding hull in phantom lines.

As best seen in FIG. 3, a cylinder block 70 and a cylinder head assembly 72 desirably form the cylinders of the engine 66. A piston reciprocates within each cylinder of the engine 66 and together the pistons drive an output shaft 76 (FIG. 1), such as a crankshaft, in a known manner. A connecting rod links the corresponding piston to the crankshaft 76. The corresponding cylinder bore, piston and cylinder head of each cylinder forms a variable-volume chamber, which at a minimum volume defines a combustion chamber.

The crankshaft 76 desirably is journalled with a crankcase, which in the illustrated embodiment is formed between a crankcase member 80 and a lower end of the cylinder block 70. Individual crankcase chambers of the engine are formed within the crankcase by dividing walls and sealing disks, and are sealed from one another with each crankcase chamber communicating with a dedicated variable-volume chamber.

Each crankcase chamber also communicates with an intake passage of an induction system 82 through a check valve (e.g., a reed-type valve). In the illustrated embodiment, the intake passage is integrally formed with the crankcase member 80; however, the engine 66 can also use a separate intake manifold equally well. A charge former 84 (e.g., a carburetor) of the induction system 82 communicates with an inlet end of the intake passage. The charge former 82 system receives fuel from the fuel tank 24 and produces the fuel charge which is delivered to the cylinders in a known manner. In the illustrated embodiment, an air intake silencer 86 is connected to an air inlet end of a throttle passage of each charge former 84. The flow path from the air intake silencer 86, through the charger former 84 and intake passage and into the corresponding crankcase chamber desirably is along a flow axis which generally is inclined relative to the central vertical plane and lies on a side of the plane opposite of the corresponding cylinder. Because the internal details of the engine 66 and the induction system 82 desirably are conventional, a further description of the engine construction is not believed necessary to understand and practice the invention.

The propulsion unit 44 supplies cooling water through a conduit to an engine cooling jacket. For this purpose, an outlet port is formed on the housing the pressurization chamber assembly of the jet pump 44. The conduit is coupled to the outlet port and extends to an inlet port to the engine water jacket. In the illustrated embodiment, the inlet port desirably lies at the lower rear end of the engine 66, either on the cylinder block 70 or on an exhaust manifold 96 of the engine which is attached to the cylinder block 70.

The engine cooling jacket extends through the exhaust manifold 96, through the cylinder block 70, about the cylinders, and through the cylinder head assembly 72. Either the cylinder head assembly 72 or the exhaust manifold 96 can includes a coolant discharge port through which the cooling water exits the engine 38 and thence flows through at least a portion of the exhaust system 12. In the illustrated embodiment, the discharge port is formed in the cylinder head assembly 72. A conduit 98 connects the discharge port to the exhaust system 12.

The personal watercraft 10 so far described represents only an exemplary watercraft on which the present exhaust system 12 can be employed. A further description of the personal watercraft 10 is not believed necessary for an understanding and an appreciation of the present exhaust system 12. The exhaust systems will now be described in detail.

The exhaust system 12 discharges exhaust byproducts from the engine 66 to the atmosphere and/or to the body of water in which the watercraft 10 is operated. As best seen in FIGS. 1 and 2, the exhaust system 12 includes the exhaust manifold 96 that is affixed to the side of the cylinder block 70 and which receives exhaust gases from the combustion chambers through exhaust ports in a well-known manner. For this purpose, the exhaust manifold desirably includes a number of runners equal in number to the number of cylinders. Each runner communicates with the exhaust port (s) of the respective cylinder. The runners of the exhaust manifold 96 thence merge together to form a common exhaust path that terminates at an outlet end of the manifold 96.

As best understood from FIG. 3, the exhaust manifold 96 has a dual shell construction formed by an inner wall 98 and an outer wall 100. A water jacket W is formed between the two walls 98, 100 and communicates with one or more water passages within the engine block 70. Cooling water therefore flow from the engine block 70 into the water jacket W of the exhaust manifold 96. This dual wall construction desirably is formed along each runner of the manifold 96, as well as about the common flow section of the manifold 96.

An outlet end of the exhaust manifold 96 communicates with an exhaust expansion chamber 102. As best seen in FIG. 1, the outlet end of the manifold 96 turns upward to mate with a down-turned inlet end of the expansion chamber 102.

With reference to FIG. 3, the expansion chamber 102 has generally tubular shape with an enlarged cross-sectional flow area as compared to the exhaust manifold 96 to allow the exhausts gases to expand and silence, as known in the art. A thick-wall, which is defined between an inner surface 104 and an outer surface 106 forms the tubular shape of the exhaust chamber 102. The inner surface 104 defines the exhaust flow passage S through the exhaust chamber 102. A plurality of water passages W extend along side the flow passage S through the thick wall of the exhaust chamber 102. The water passages W desirably are spaced about the inner surface 104.

Figure 4:
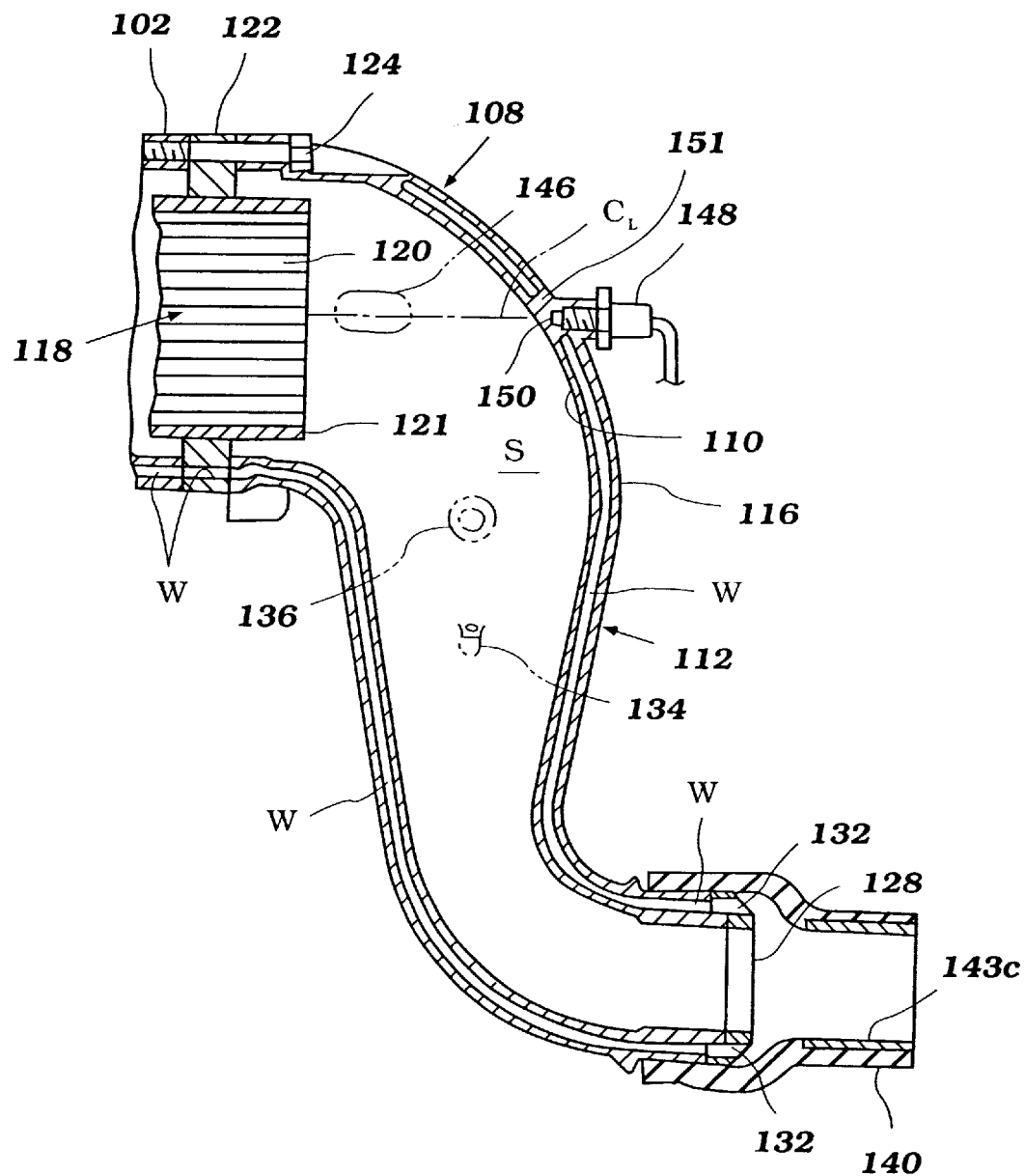
FIG. 4 is a side cross-sectional view of an upper exhaust pipe of the exhaust system of FIG. 1.
Figure 5:
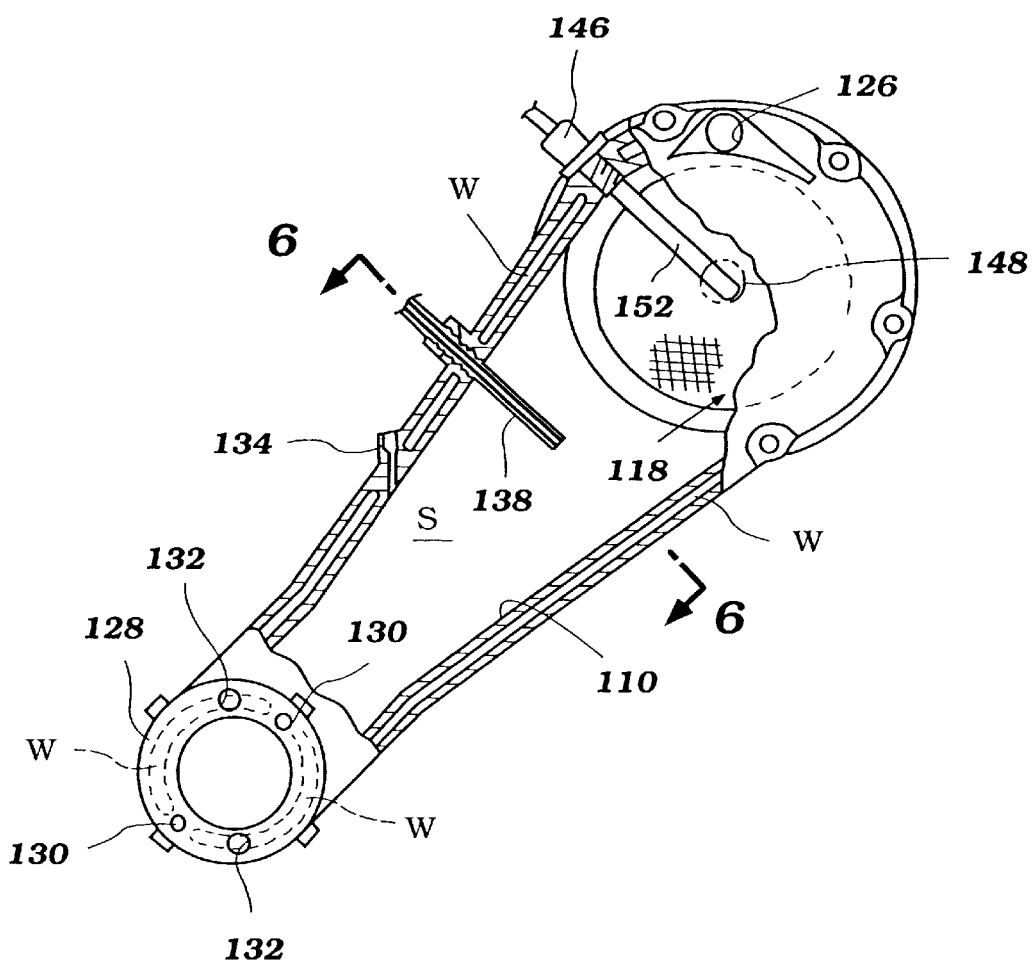
FIG. 5 is a rear partial sectional view of the upper exhaust pipe of the FIG. 4.
Figure 6:
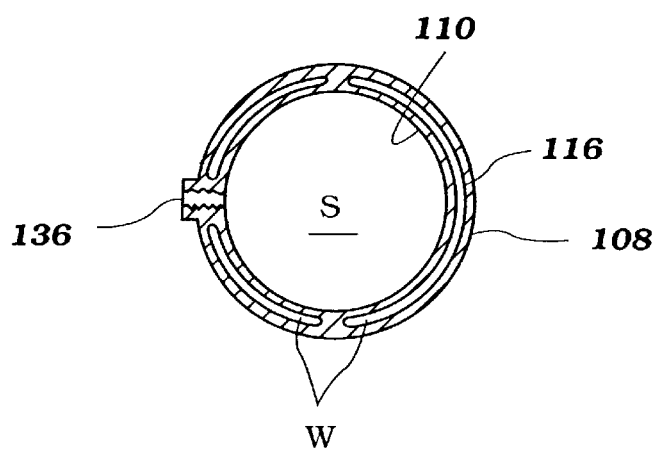
FIG. 6 is a cross-sectional view of the exhaust pipe of FIG. 5 taken along lines 5—5 and illustrates an exhaust collection port with an exhaust passage element removed.

An outlet end of the exhaust chamber 102 communicates with an inlet end of a lower exhaust chamber 108. As seen in FIGS. 4 through 6, the exhaust chamber 108 has a dual shell construction formed by an inner shell 110 which defines an exhaust flow passage S. The inner shell 110 has a diameter at its inlet end that generally matches the diameter of the downstream end of the expansion chamber 102. As best seen in FIG. 4, the inner tube 110 turns down into a vertical section 112 (goose neck-like section) and thence transitions to a lower discharge end 114 arranged to give the inner shell a generally reverse S-like shape. The inner shell 110 also extends to one side of the engine 66, as best seen in FIGS. 2 and 5.

An outer shell 116 is connected to the inner shell 110 and generally has a corresponding shape to that of the inner shell 110. The inner and outer shells 110, 116 thus together define a cooling jacket W about the inner shell 110. The water jacket W of the exhaust chamber 108 communicates with the water jacket W of the expansion chamber 102 to receive cooling water from the engine 66.

The exhaust system 12 also includes a catalytic device 118. The catalytic device 118 desirably includes a catalyst bed 120 to at least a portion of the exhaust gases into harmless gases (e.g., carbon dioxide and water). The catalyst bed 120 lies within the exhaust gas flow through the exhaust system 12 at a position that mandates that all exhaust gases must pass through the catalyst bed 120. The catalyst 120 reduces the emissions of hydrocarbons and other exhaust byproducts (e.g., carbon monoxide and oxides of nitrogen) from the watercraft engine.

For this purpose, the catalyst bed 120 is formed of a catalytic material, which is designed to render harmless either all or some of the exhaust byproducts. For example, the catalyst bed 120 can be made of a metal catalyst material, such as, for example, platinum.

The catalyst bed 120, however, can be made of different types of catalytic materials for treating different exhaust byproducts or lubricant.

The catalyst bed 120, in the illustrated embodiment, takes the form of a honeycomb-type catalyst bed. An tubular shell 121 desirably supports the catalyst bed 120 with an annular flange 122 supporting the shell 121. The flange 122 is held between the corresponding ends of the expansion chamber 102 and the exhaust chamber 108. Bolts 124 secure together the ends of the chambers 102, 108 with the flange 122 interposed therebetween. In this position, the catalytic device 118 lies below the access opening 35 for maintenance and servicing ease.

The annular flange 122 also includes a plurality of apertures W which place the cooling passages W of the expansion chamber 102 in communication with the water jacket W of the exhaust chamber 108.

A majority of the cooling water that flows through the apertures W in the flange subsequently flows through the water jacket W of the exhaust chamber 108 to the discharge end 114 of the chamber 108. A small portion of the water flow, however, is directed through a port 126 which communicates with a telltale or pilot water port via a connecting conduit. The telltale port provides a visual indication to the rider that the water cooling system is functioning properly.

A throttle ring 128 is attached to the lower end 114 of the exhaust chamber 108 by bolts that pass through several through holes 130 in the throttle ring 128. The throttle ring 128 has an inner diameter that generally matches the diameter of the exhaust passage S at the lower end 114. Several apertures 132 extend through the throttle passage and are arranged to communicate with the water jacket W of the exhaust chamber 108. The apertures 132, however, provide a significantly smaller cross-sectional flow area than the water jacket W to restrict water flow through the exhaust chamber water jacket W. As best understood from FIG. 4, the apertures 132 open into a common exhaust passage downstream of the exhaust chamber 108. In this manner, the water flow through the water jacket W merges with the exhaust gas flow through the exhaust passage in order to silence and cool the exhaust gases.

A water inlet port 134 extends through the side of the exhaust chamber 108. In the illustrated embodiment, the water inlet port 134 is located in the generally vertical section 112 of the chamber 108. And as best seen in FIG. 5, the water inlet port 134 slopes downward toward the discharge end 114 of the chamber 108 and away from the catalytic device 118. Thus, an axis of the port 134 in a direction into the exhaust passage extends away from the catalytic device 118, as well as away from one or more sensors, which are described below.

A source of cooling water communicates with the inlet port 134 to introduce a cooling water into the exhaust chamber 108 for cooling and silencing purposes within the chamber 108. Fresh (i.e., unheated) cooling water can be directly supplied from the jet pump unit 44 or from a bilge pump located within the lower hull portion 16. Cooling water can also be delivered from other cooling jackets or passages of the engine 66 or of associated equipment. For this purpose, a delivery conduit (not shown) desirably is connected to the port 134 for delivering this additional cooling water into the chamber 108.

As best seen in FIGS. 5 and 6, an exhaust gas collection port 136 is formed in exhaust chamber 108. The port 136 desirably extends through both the inner and outer shells 110, 116 of the chamber 108. The port 136 also is formed such that the water jacket W of the chamber 108 surrounds the port 136, as appreciated from a review of FIGS. 5 and 6.

In the illustrated embodiment, the port 136 is tapped and receives a threaded portion of an L-shaped exhaust gas collection element 138 that projected into the chamber 108. The distal end of the collection element 138 desirably lies at approximately the center of the exhaust passage S in the generally vertical section 112 of the chamber 108. The axis of the port 136 also desirably lies generally transverse to an axis of the generally vertical section 112 such that the distal end of the gas collection element 138 is substantially perpendicular to the gas flow through the corresponding section of the chamber 108.

In this position, the exhaust gas collection port 136 lies generally beneath the access opening 35 in the upper deck 18, , as best seen in FIG. 2. This location facilitates easily maintenance and replacement of the collection element 138, as well as an associated oxygen probe (not shown). In addition, the collection port 136 is adapted to receive other types of exhaust gas sensors for sampling and analyzing the exhaust gas content for diagnostic purposes. If, for example, the engine 66 is running rough, a mechanic may remove either the oxygen sensor or the entire collection element 138 and insert in its place an exhaust gas sensor plug. The sensor obtains a sample of the exhaust gases for analysis for diagnosis. Once analysis is complete, the oxygen sensor and/or the collection element 138 can be reinstalled for use during normal operation, as described below.

With reference to FIGS. 1 and 4, a flexible pipe section 140 is connected to the discharge end 114 of the exhaust chamber 108 and the throttle ring 132 and extends rearwardly along one side of the watercraft hull tunnel 42. The flexible conduit 140 connects to an inlet section of a water trap device 142. The water trap device 142 also lies within the watercraft hull 14 on the same side of the tunnel 42. An inner aluminum alloy reinforcing tube 143 desirably extends along a middle section of the flexible pipe section 140 to strengthen the pipe 140 at this location.

The water trap device 142 has a sufficient volume to retain water and to preclude the back flow of water to the expansion chamber 102 and the engine 66. Internal baffles within the water trap device 142 help control water flow through the exhaust system 12.

An exhaust pipe 144 extends from an outlet section of the water trap device 142 and wraps over the top of the tunnel 42 to a discharge end 144. The discharge end 144 desirably opens into the tunnel 42 or through the transom of the watercraft 10 at an area that is close to or actually below the water level with the watercraft 10 floating at rest on the body of water.

A control system desirably manages the operation of the engine 66. The control system includes an electronic control unit (ECU) 145 that receives signals from various sensors regarding a variety of engine functions. As part of a feedback control system, the ECU 145 receives signals from an oxygen sensor that sensors oxygen content of exhaust gases collected in the collection element 138 mounted within the exhaust collection port 136. The oxygen sensor produces a signal indicative of the sensed oxygen content. Based upon this information, the ECU 145 adjusts the fuel/air ratio by controlling either a throttle device of the induction system 82 or the charge former 84 or both.

The position of the probe upstream of both the water inlet port 134 as well as the merge point of the cooling water with the exhaust stream at the discharge end 114 of the chamber 108 generally isolates the collection process from the effects of the water flow through the exhaust system 12. While some coolant may travel backward toward the collection element 138 on occasion, such as by force of strong exhaust gas pulses, no meaningful amount of liquid coolant is present within the exhaust stream at the point of sampling, and thus, the gases can flow freely through the collection element 138 without impedance from entrained liquid in the flow. The oxygen sensor therefore more accurately senses the oxygen content of the exhaust stream for improved engine control.

In order to monitor the exhaust system 12, the ECU 145 can also communicate with one or more temperature sensors. In the illustrated embodiment, the ECU 145 communicates with an exhaust gas temperature sensor 146 and an exhaust pipe temperature sensor 148. The transducers of the sensors 146, 148 desirably are positioned to lie generally along a center line CL of the exhaust passage S as it passes through the catalyst bed 120.

Figure 7:
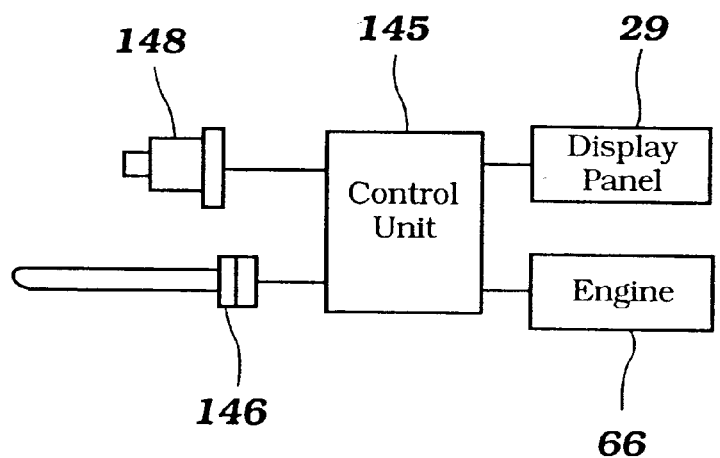
FIG. 7 is a schematic view of a control and monitoring system for the exhaust system of FIG. 1.

As best seen in FIG. 4, the exhaust pipe temperature sensor 148 is removably attached to a mounting aperture formed in the exhaust chamber 108. When assembled, a transducer element 150 of the sensor 148 generally contacts the inner shell 110 of the chamber 108. The sensor 148 thus converts the temperature of the inner shell 110 into a signal which is indicative of the sensed temperature and, as schematically illustrated in FIG. 7, communicates this information to the ECU 145 via known means. Importantly, the water jacket W of the exhaust chamber 108 extends about the a boss 151 between the inner and outer shells 110, 116 and in which the mounting aperture is formed. In this manner, the temperature sensor 148 obtains an accurate reading the exhaust system 12 as water cooled.

FIG. 5 best illustrates the exhaust gas temperature sensor 146. The sensor 146 is removably attached to a mounting aperture formed in an upper section of the chamber 108. A transducer element 152 cantilevers from one side of the inner shell 110 to position its distal end to generally lie at the center line CL. The exhaust gas temperature sensor 146 likewise converts the temperature of the exhaust gas flowing through the exhaust passage S into a signal which is indicative of the sensed temperature and, as schematically illustrated in FIG. 7, communicates this information to the ECU 145 via known means. The ECU 145 then controls indicate lights on the control panel 29 and the engine 66 as described below.

Figure 8:
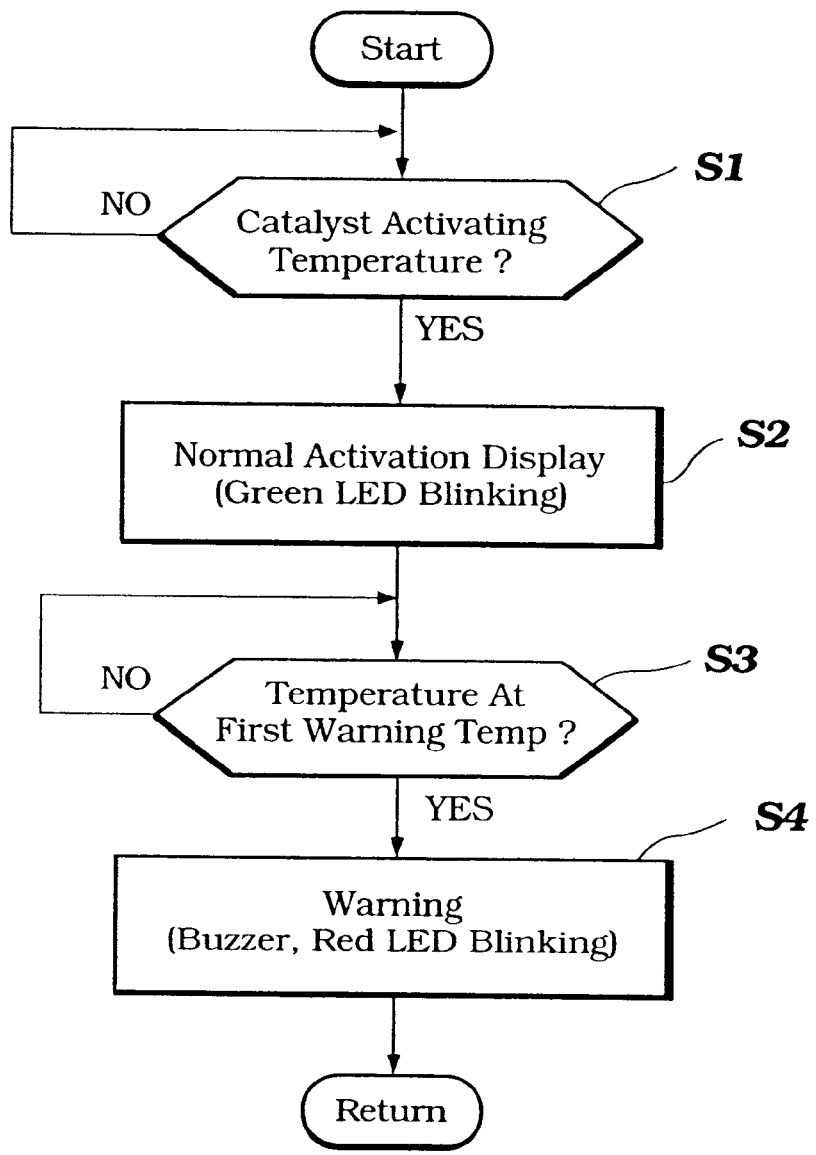
FIGS. 8 and 9 are flow charts of the functional steps performed by the control and monitoring system.

One of the tasks or routines run by the ECU 145 involves the comparison of the sensed exhaust gas temperature (from the gas temperature sensor 146) against upper and lower temperature limits of the particular catalyst 118 used with the catalytic device. FIG. 8 set forth a high level flow chart for this function of the ECU 145. The ECU 145 initially compares the sensed temperature against a catalyst activation temperature (as schematically represented in decision block S1). In an exemplary embodiment, the catalyst activation temperature is about 600° Celsius. This value is stored in non-volatile memory in the control system of which the ECU 145 is part. If the sensed temperature is below the stored value, the ECU 145 performs this wait loop again.

Once the sensed temperature equals or is greater than the stored catalyst activation temperature, the ECU 145 activates a system-ready indicator, for example, the green indicator light on the control panel 29 (as represented in action block S2), to indicate that the catalyst 120 is operating within its designed temperature range.

The ECU 145 also continues to monitor the sensed exhaust gas temperature and to compare it against a first warning temperature (as represented in decision block S3). For instance, in an exemplary embodiment, the first warning temperature is equal to about 1150° Celsius which is stored in memory. If the sensed temperature is below the stored first warning temperature, the ECU 145 continuously repeats this wait loop. If, however, the sensed exhaust gas temperature equals or exceeds the stored value, the ECU 145 activates a warning buzzer and the red indicator light on the display panel 29 (as represented in action block S4). The red warning lamp desirably blinks to draw the rider's attention. Once the ECU 145 activates the warning system, the ECU returns to the start of the routine and performs the task again.

Figure 9:
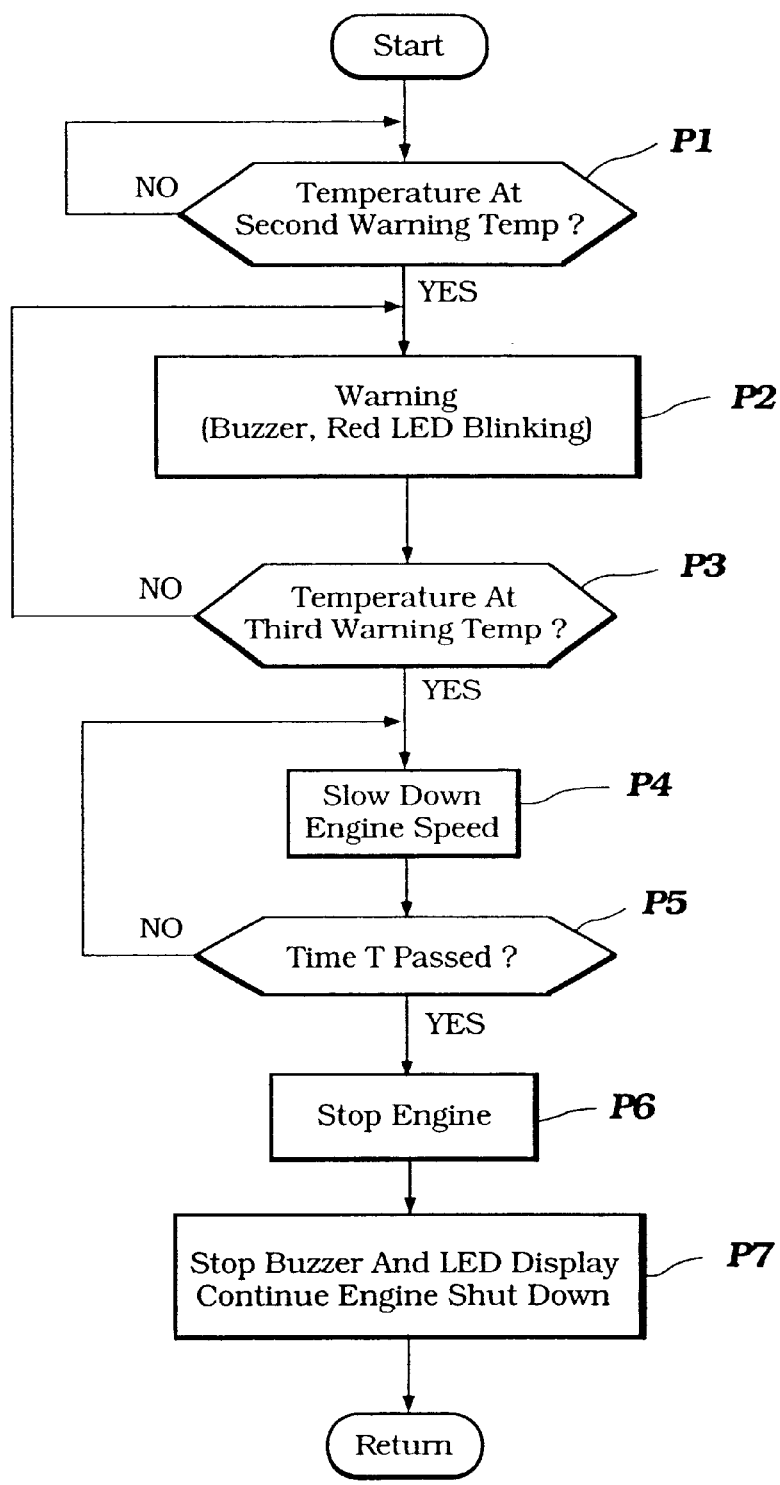

Another task or routine run by the ECU 145 involves the comparison of the sensed exhaust system temperature (from the exhaust pipe temperature sensor 148) against various warning level temperatures. FIG. 9 set forth a high level flow chart for this function of the ECU 145. The ECU 145 initially compares the sensed temperature against a second warning temperature (as schematically represented in decision block P1). In an exemplary embodiment, the second warning temperature is about 110° Celsius. This value is stored in the non-volatile memory. If the sensed temperature is below the stored value, the ECU 145 performs this wait loop again.

If the sensed exhaust system temperature equals or exceeds the persecuted second warning temperature, the ECU 145 activates a warning buzzer and the red indicator light on the display panel 29 (as represented in action block P2). The red warning lamp desirably blinks to draw the rider's attention. Once the ECU 145 activates the warning system, the ECU continues to monitor the temperature of the exhaust system 12.

The ECU 145 compares the sensed temperature against a third warning temperature (as schematically represented in decision block P3). In an exemplary embodiment, the third warning temperature is about 250° Celsius. This value is also stored in the non-volatile memory. If the sensed temperature is below the stored value, the ECU 145 performs this wait loop again, while continuing to activate the warning system. Although not illustrated, the ECU can also continue to compare the sensed temperature against the second warning temperature while in this wait loop in order to evaluate whether to continue to sound the alarm.

In the event that the sensed temperature of the exhaust system 12 equals or exceeds the stored third warning temperature, the ECU 145 begins to shut down the engine. The ECU 145 initially begins to slow down engine speed (as represented in action block P4) before stopping the engine. This can be accomplished in a variety of know ways which will be readily apparent to those skilled in the art. In the illustrated embodiment, the ECU 145 controls an actuator that operates one or more throttle devices of the induction system 82. Engine speed is reduced by closing the opening degree of the throttle device.

The closure of the throttle device(s) desirably occurs over a period of time, rather than instantaneous. For this purpose, the ECU 145 performs a wait loop for a set amount of time T. The ECU 145 clocks passed time from the beginning of engine slow down and compares that time to the preselected amount of time T (as represented in decision block P5). The ECU 145 or an external component of the control system can keep time for this purpose. If the time passed is less than the preselected amount of time T, the ECU 145 continues with this wait loop.

Once the time passed equals or exceeds the preselected time T, the ECU 145 shuts down the engine 66 (as represented in action block P6). Again, this can be accomplished in a variety of know ways which will be readily apparent to those skilled in the art. In the illustrated embodiment, the ECU 145 controls a fuel valve (not shown) which is positioned between the charge formers 84 of the induction system and the fuel tank 24. Closure of the fuel valve stalls the engine 66.

The ECU 145 then deactivates the warning system, turning off buzzer and the warning lamps (as represented in action block P7). Once the engine 66 is shut down, the engine cannot be restarted until the control system is reset (which can be done either manually or automatically). Once reset, the ECU 145 returns to the start of the routine be perform this task again.

Figure 10:
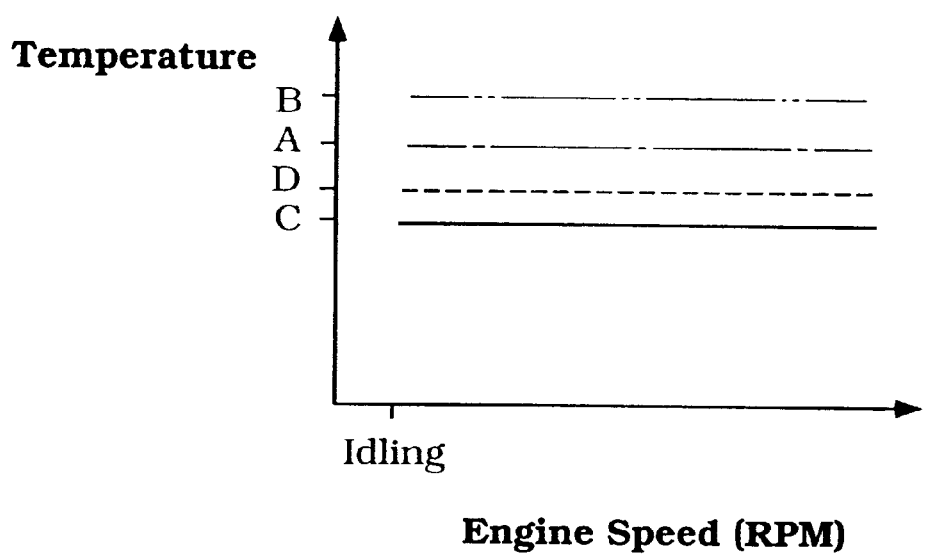
FIG. 10 is a graph of preselected temperature limits stored in memory of the control and monitoring system verses engine speed.

The catalyst activation temperature as well as the first, second and third warning temperatures are selected according to the characteristics of the particular engine 66 and exhaust system 12 of the watercraft 10. The above noted temperatures thus are merely exemplary; however, it is desirably to use uniform temperatures for each temperature datum, regardless of engine speed. FIG. 10 graphically represents this point. Line A corresponds to the catalyst activation temperature. Line B corresponds to the first warning temperature. Line C corresponds to the second warning temperature. And Line D corresponds to the third warning temperature. The temperatures represented by lines A and B of course relate to the temperature of the exhaust gases within the exhaust system 12, while the temperatures represented by lines C and D relate to the temperature of the water-cooled exhaust system 12.

Operating temperatures that exceed the first warning temperature and that exceed second and third warning temperatures thus are indicative of different problems. If the exhaust gas temperature exceeds the first warning temperature, it indicates too high of an operating temperature at the catalyst 120. This often is caused by the combustion of unburnt fuel in the exhaust gases. Unburnt fuels commonly ignite in the vicinity of the high-temperature catalyst 120. Too high of a temperature at the catalyst 120 can damage the catalyst, as mentioned above.

If the temperature of the exhaust system 12 on the hand exceeds either the second or third warning temperature, it tends to indicate a problem with the cooling system. Due to the highly adverse effects caused by excessive heat within the engine 66 and the exhaust system 12, as well as within the confined engine compartment 38 of the personal watercraft 10, the control system does not allow the engine to run when the exhaust system temperature exceeds the third warning temperature.

The control system thus uses the temperature of the exhaust gases within the exhaust system and the temperature of the exhaust system itself to monitor the operation of the engine's cooling system and the catalytic device. Initial warning levels alert the rider, while advanced warning levels actually control engine function by slowing and stopping the engine.

Several additional embodiments of the exhaust monitoring and control system are disclosed below. Each of these embodiments employs the same basic concepts characteristic of improving the monitoring and control of the engine and exhaust system's function. For ease of description, similar features are ascribed the same reference numeral used for corresponding elements of the embodiments with a letter suffix. The suffix "a" will be used for the embodiment illustrated in FIGS. 11–12, the suffix "b" will be used for the embodiment illustrated in FIG. 13, and the suffix "c" will be used for the embodiment illustrated in FIGS. 14 and 15.

FIGS. 11 and 12 illustrate another embodiment and arrangement of the exhaust system sensor 148a in the exhaust system 12a. The other sensory components as well as the other components of the exhaust and control systems are the same as described above, and therefore the above description should of such components should apply equally to the present embodiment.

The exhaust system temperature sensor 148a is located near a lower end of the generally vertical section 112a of the exhaust chamber 108a. The sensor 148a includes a pair of parallel transducers 150a. Each transducer 150a is positioned in a mounting aperture formed in a boss 151a. The boss 151a extends to the side of the chamber 108a. The head of each transducer 150a is positioned to lie near a portion of the outer wall 116a of the exhaust chamber 108a with a water jacket passage W passing along an inner surface of the outer wall portion. The sensor 148a converts the temperature of the outer shell 116a into a signal which is indicative of the sensed temperature and, as schematically illustrated in FIG. 11, communicates this information to the ECU 145a by known means. In this position, the sensor 148a obtains an accurate reading of the exhaust system 12a as water cooled.

In this location, the sensor 148a takes temperature readings of the exhaust system at a portion of the exhaust system 12a through which partially silenced exhaust gases flow. As noted above, cooling water is introduced into the exhaust gas stream through the water inlet port 134a. The cooling water cools and partially silences the exhaust gases at the stream flows through the lower half of the exhaust chamber 108a. Accordingly, the preselected second and third warning temperatures have different valves than those mentioned above; however, the routines and control performed by the ECU 145a are the same.

FIG. 13 illustrates an additional embodiment of the exhaust pipe temperature sensor 148b and the arrangement of the sensor 148b on the exhaust chamber 108b. The exhaust system temperature sensor 148b is located near a lower end of the generally vertical section 112b of the exhaust chamber 108b. The sensor 148b includes a pair of parallel transducers 150b. Each transducer 150b is positioned in a mounting aperture formed in a boss 151b. The boss 151b extends to the side of the chamber 108b. The head of each transducer 150b is positioned to lie within a water jacket passage W in order to sense the temperature of the cooling water passing through the jacket. The sensor 148b converts the temperature of the cooling water into a signal which is indicative of the sensed temperature and communicates this information to the ECU 145b by known means.

The same monitoring effects can be expected with this arrangement of the temperature sensor 148b, although the preselected warning temperatures are different from those mentioned above; however, the routines and control performed by the ECU 145b are the same.

Figure 15:
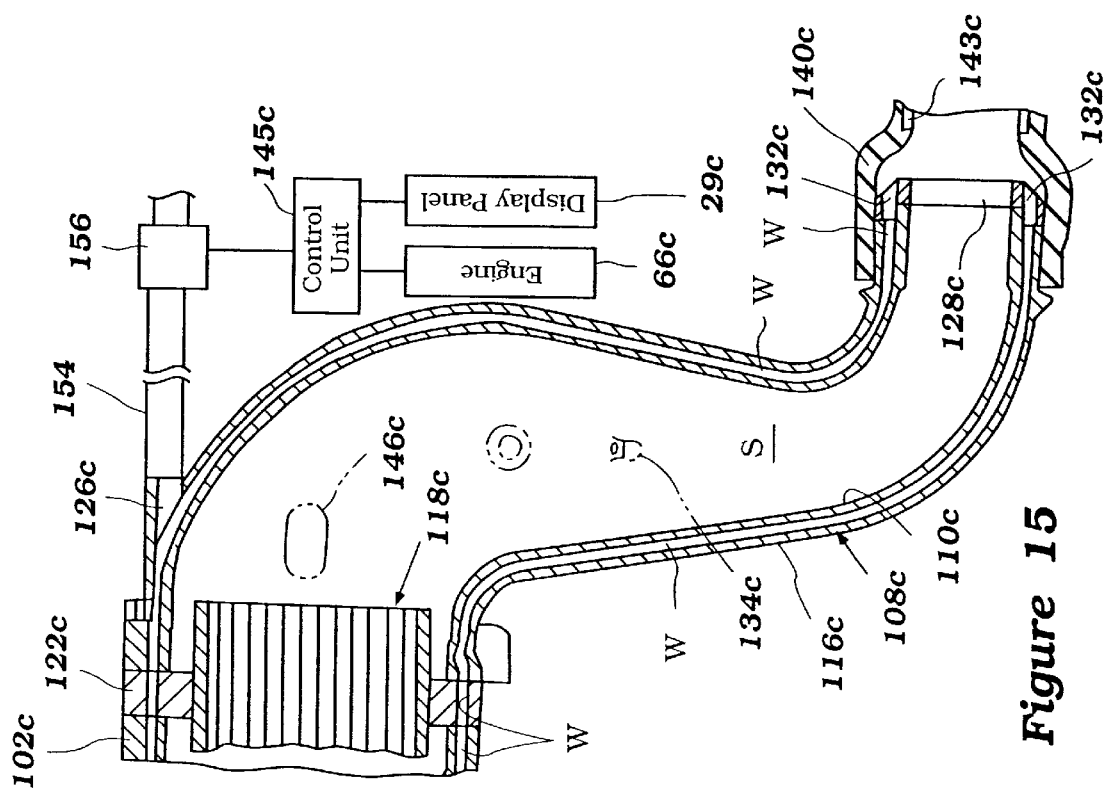
FIG. 15 is a cross-sectional view of a portion of the exhaust system taken along line 15—15 of FIG. 14 and schematically illustrates a control and monitoring system used with the exhaust system and the engine.
Figure 14:
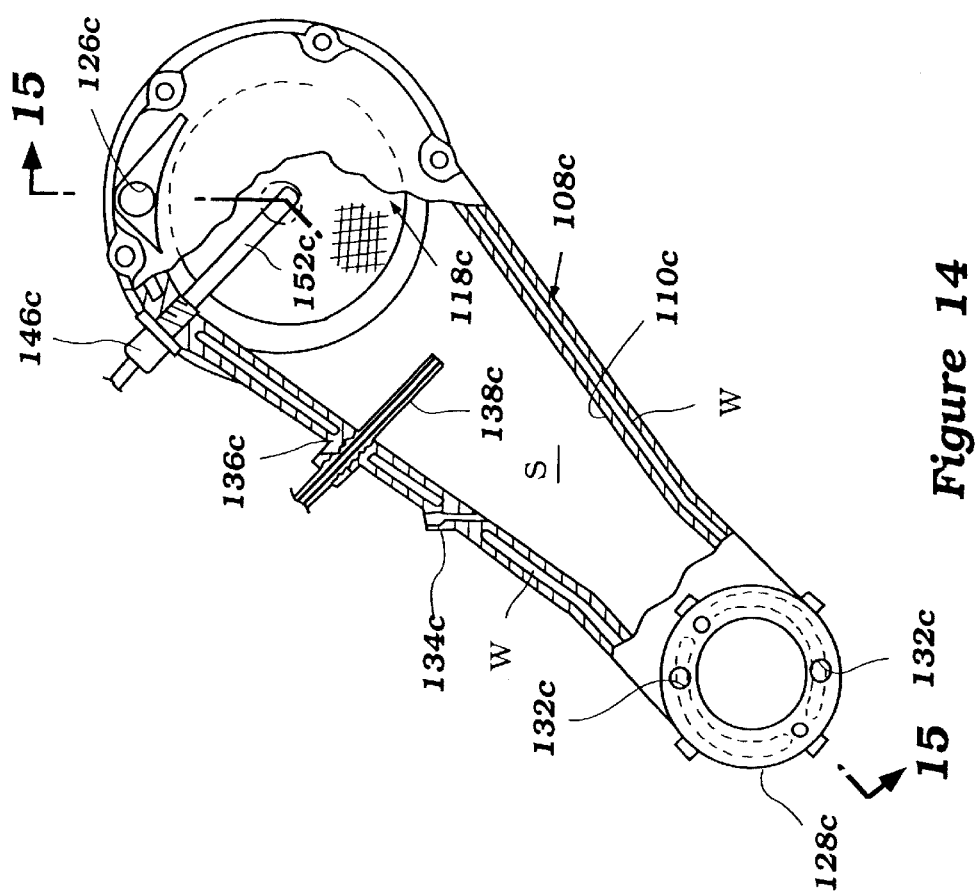
FIG. 14 is another sensory system that can be used with the present exhaust system.

FIGS. 14 and 15 illustrate another embodiment of the monitoring and control system for the engine 66c and the exhaust system 12c. In this embodiment, a majority of the cooling water flows through the drainage port 126c located at the upper end of the exhaust chamber 108c. The water is discharged from the watercraft 10 through a conduit 154. In an exemplary embodiment, the discharge end of the conduit 154 connects to the exhaust pipe 144 downstream of the water trap 142. The balance of the water that passes through the jacket W about the catalytic device 118 flows through the cooling water jacket W of the exhaust chamber 108c and merges with the exhaust gases downstream of the throttle ring 128c.

A flow meter 156 desirably senses the water flow rate or volume through the conduit 154. The meter produces a signal which is indicative of the flow rate or volume, and sends the information to the ECU 145c via conventional means, as schematically represented in FIG. 15. The ECU also receives a signal from an engine sensor that determines the engine speed. The ECU 145 compares this flow rate and engine speed against a desired flow rate profile.

Figure 16:
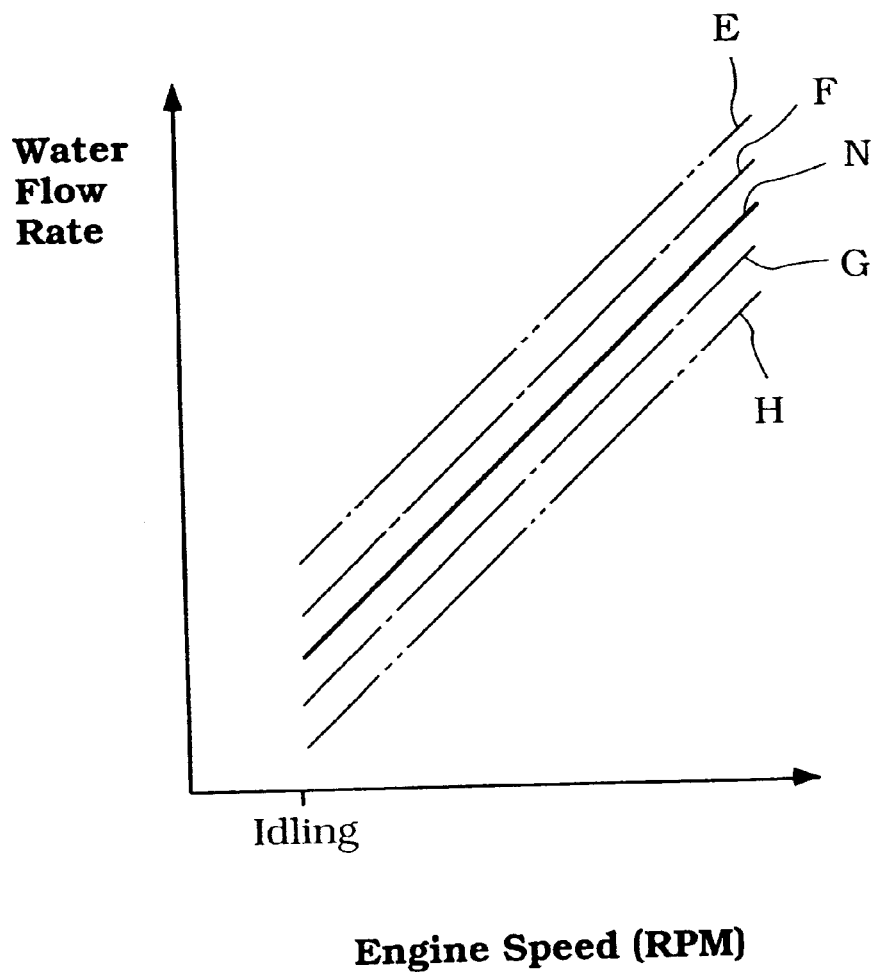
FIG. 16 is a graph of cooling water flow rates verses engine speed, which data is stored in memory of control and monitoring system.

FIG. 16 illustrates an exemplary cooling water flow rate profile verses engine speed. Line N represents a desired flow rate profile, and lines F and G represents a flow rate profile at which to trigger a first level warning. Lines E and H represent flow rate profiles at which to trigger a second level warning. In each of these cases, the flow rate increase with increasing engine speed. In the case of the profiles represented by Lines E and F, the flow rate is too high and the engine and the exhaust system are not being properly cooled. And in the case of the profiles represented by Line G and H, the flow rate is too low which may be indicative of a restriction in the cooling system. In such cases, the engine is not be properly cooled. Of course, these flow rate profiles desirably are tailored to the characteristics of the particular engine 66 and exhaust system 12 of the watercraft 10 on which the control system is employed.

The ECU 145c uses this information to control the engine 66c and the display panel 29c. For this purpose, the desired profiles and the warning level profiles are stored in memory and are accessible by the ECU 145c.

In operation, the ECU 145c compares the sensed flow rate against the various flow rate profiles. The ECU 145c initially compares the sensed flow rate against the first level warning flow rates for the determined engine speed to determine whether the sensed flow rate is within the acceptable range between the upper and lower limits (as defined by Lines F and G). If the sensed flow rate is within this range, the ECU 145c performs this wait loop again.

If the sensed flow rate is outside the acceptable range, the ECU 145c activates a warning buzzer and the red indicator light on the display panel 29c. The red warning lamp desirably blinks to draw the rider's attention. Once the ECU 145c activates the warning system, the ECU continues to monitor the flow rate of the exhaust system 12.

The ECU 145c compares the sensed flow rate against a first level warning range defined between the extreme upper and lower limits (as defined by Lines E and H). If the sensed flow rate is within this range, the ECU 145c performs this wait loop again, while continuing to activate the warning system. Although not illustrated, the ECU can also continue to compare the sensed flow rate against the acceptable flow rate range (defined between Lines F and G) while in this wait loop in order to evaluate whether to continue to sound the alarm.

In the event that the sensed flow rate falls outside the first warning level range, the ECU 145c begins to shut down the engine 66c. The ECU 145c desirably first slows down and then stalls the engine 66*c* in the manner described in connection with the embodiment of FIGS. 1 through 10. Once the engine 66*c* is shut down, the engine cannot be restarted until the control system is reset (which can be done either manually or automatically). Once reset, the ECU 145*c* returns to the start of the routine be perform this task again.

It is understood that a control system can employ any one or several of the sensory system described above. For instance, a control system can utilize both the exhaust system temperature sensor 148 of FIG. 4, as well as the cooling water flow rate meter of FIG. 15. The use of multiple sensor will enhance the reliability as well as the accuracy of the control system.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A watercraft comprising an internal combustion engine having at least one exhaust port and an output shaft, a propulsion device driven by the engine output shaft, an exhaust system comprising an exhaust passage that extends between the engine exhaust port and a discharge port, a catalytic device being disposed within said exhaust system, a cooling jacket extending along a portion of the exhaust system in the vicinity of the catalytic device, and an exhaust system temperature sensor being located between said catalytic device and a point at which cooling water is introduced from said cooling jacket into exhaust gases flowing within said exhaust system, said exhaust system temperature sensor being arranged such that said cooling jacket extends around at least a portion of said exhaust system temperature sensor and said exhaust system temperature sensor being disposed along an axial centerline of said catalytic device.

2. A watercraft comprising an internal combustion engine having at least one exhaust port and an output shaft, a propulsion device driven by the engine output shaft, an exhaust system comprising an exhaust passage that extends between the engine exhaust port and a discharge port, a catalytic device being disposed within said exhaust system, a cooling jacket extending along a portion of the exhaust system in the vicinity of the catalytic device, and an exhaust system temperature sensor being located between said catalytic device and a point at which cooling water is introduced from said cooling jacket into exhaust gases flowing within said exhaust system, said exhaust system temperature sensor being arranged such that said cooling jacket extends around at least a portion of said exhaust system temperature sensor and said exhaust system temperature sensor being an exhaust gas temperature sensor that extends into exhaust gases flowing within said exhaust system.

3. A watercraft comprising an internal combustion engine having at least one exhaust port and an output shaft, a propulsion device driven by the engine output shaft, an exhaust system comprising an exhaust passage that extends between the engine exhaust port and a discharge port, a catalytic device being disposed within said exhaust system, a cooling jacket extending along a portion of the exhaust system in the vicinity of the catalytic device, and an exhaust system temperature sensor being located between said catalytic device and a point at which cooling water is introduced from said cooling jacket into exhaust gases flowing within said exhaust system, said exhaust system comprising a double shell construction proximate said exhaust system temperature sensor, said double shell construction comprising an inner wall and an outer wall with said cooling jacket being defined between said inner wall and said outer wall, said exhaust system temperature sensor comprising an exhaust pipe temperature sensor that is arranged to detect a temperature of said inner wall, said exhaust system temperature sensor being arranged such that said cooling jacket extends around at least a portion of said exhaust system temperature sensor, said exhaust pipe temperature sensor communicating with a controller and said controller activates an alarm if said exhaust pipe temperature sensor detects a temperature above a preset temperature and said exhaust pipe temperature sensor communicating with a controller and said controller slowing an engine speed if said exhaust pipe temperature sensor detects a temperature above a preset temperature.

4. A watercraft comprising an internal combustion engine having at least one exhaust port and an output shaft, a propulsion device driven by the engine output shaft, an exhaust system comprising an exhaust passage that extends between the engine exhaust port and a discharge port, a catalytic device being disposed within said exhaust system, a cooling jacket extending along a portion of the exhaust system in the vicinity of the catalytic device, and an exhaust system temperature sensor being located between said catalytic device and a point at which cooling water is introduced from said cooling jacket into exhaust gases flowing within said exhaust system, and a coolant flow rate sensor being disposed upstream of said point at which cooling water is introduced from said cooling jacket into exhaust gases flowing within said exhaust system.

5. A watercraft as in claim 4, wherein said coolant flow rate sensor communicates with a controller and said controller activates an alarm if said coolant flow rate sensor detects a flow rate less than a preset flow rate.

6. A watercraft as in claim 5, wherein said controller slows an engine speed if said coolant flow rate sensor detects a flow rate less than a second preset flow rate that is less than said preset flow rate.

7. A watercraft as in claim 4, wherein said coolant flow rate sensor communicates with a controller and said controller slows an engine speed if said coolant flow rate sensor detects a flow rate less than a preset flow rate.

8. A watercraft comprising an internal combustion engine having at least one exhaust port and an output shaft, a propulsion device driven by the engine output shaft, an exhaust system comprising an exhaust passage that extends between the engine exhaust port and a discharge port, a catalytic device being disposed within said exhaust system, a cooling jacket extending along a portion of the exhaust system in the vicinity of the catalytic device, and an exhaust system temperature sensor being located between said catalytic device and a point at which cooling water is introduced from said cooling jacket into exhaust gases flowing within said exhaust system, and a control system communicating with an induction system of said engine in a manner controlling operation of said engine depending upon a sensed temperature of said exhaust system whereby said control system slows or stops said engine when said sensed temperature exceeds a preset temperature.

9. A watercraft comprising an internal combustion engine having at least one exhaust port, an exhaust system comprising an exhaust passage that extends between the engine exhaust port and a discharge port, a catalytic device disposed within said exhaust system, a cooling system comprising a cooling jacket that extends along a portion of the exhaust system and that communicates with said exhaust system at a location downstream of said catalytic device, a sensor disposed along said exhaust system at a location upstream of said location at which said cooling system communicates with said exhaust system, said sensor comprising a temperature sensor arranged to sense a temperature of a portion of said exhaust system, said sensor being capable of outputting a range of output signals indicative of a relative degree of operability of said cooling system and a control system communicating with said sensor and operating said engine depending upon said sensed degree of operability of said cooling system, and said temperature sensor comprising a transducer, said cooling jacket being defined by an inner shell and an outer shell and said transducer extending between said inner shell and said outer shell.

10. A watercraft as in claim 9, wherein said transducer is exposed to a passage defined between said inner shell and said outer shell.

11. A watercraft as in claim 9, wherein said transducer is embedded in a mounting structure defined between said inner shell and said outer shell.

12. A watercraft comprising an internal combustion engine having at least one exhaust port, an exhaust system comprising an exhaust passage that extends between the engine exhaust port and a discharge port, a catalytic device disposed within said exhaust system, a cooling system comprising a cooling jacket that extends along a portion of the exhaust system and that communicates with said exhaust system at a location downstream of said catalytic device, a sensor disposed along said exhaust system at a location upstream of said location at which said cooling system communicates with said exhaust system, said sensor comprising a temperature sensor arranged to sense a temperature of a portion of said exhaust system, said sensor being capable of outputting a range of output signals indicative of a relative degree of operability of said cooling system and a control system communicating with said sensor and operating said engine depending upon said sensed degree of operability of said cooling system, and said cooling jacket being defined, at least in part, by an inner shell, said inner shell defining at least a portion of said exhaust passage and said temperature sensor having a transducer arranged to sense a temperature of said inner shell.

13. A watercraft comprising an internal combustion engine having at least one exhaust port, an exhaust system comprising an exhaust passage that extends between the engine exhaust port and a discharge port, a catalytic device disposed within said exhaust system, a cooling system comprising a cooling jacket that extends along a portion of the exhaust system and that communicates with said exhaust system at a location downstream of said catalytic device, a sensor disposed along said exhaust system at a location upstream of said location at which said cooling system communicates with said exhaust system, said sensor being capable of outputting a range of output signals indicative of a relative degree of operability of said cooling system and a control system communicating with said sensor and operating said engine depending upon said sensed degree of operability of said cooling system, said sensor comprises a flow meter positioned to detect at least a portion of said coolant flow through said cooling jacket.

14. A watercraft comprising an internal combustion engine having at least one exhaust port, an exhaust system comprising an exhaust passage that extends between the engine exhaust port and a discharge port, a catalytic device disposed within said exhaust system, a cooling system comprising a cooling jacket that extends along a portion of the exhaust system and that communicates with said exhaust system at a location downstream of said catalytic device, a sensor disposed along said exhaust system at a location upstream of said location at which said cooling system communicates with said exhaust system, said sensor being capable of outputting a range of output signals indicative of a relative degree of operability of said cooling system and a control system communicating with said sensor and operating said engine depending upon said sensed degree of operability of said cooling system, said control system comprises means for reducing engine speed depending upon said sensed degree of operability of said cooling system.

15. A watercraft comprising an internal combustion engine having at least one exhaust port, an exhaust system comprising an exhaust passage that extends between the engine exhaust port and a discharge port, a catalytic device disposed within said exhaust system, a cooling system comprising a cooling jacket that extends along a portion of the exhaust system and that communicates with said exhaust system at a location downstream of said catalytic device, a sensor disposed along said exhaust system at a location upstream of said location at which said cooling system communicates with said exhaust system, said sensor being capable of outputting a range of output signals indicative of a relative degree of operability of said cooling system and a control system communicating with said sensor and operating said engine depending upon said sensed degree of operability of said cooling system, a temperature sensor arranged within said exhaust passage to sense a temperature of exhaust gases passing through said exhaust passage and said temperature sensor communicating with said control unit.

* * * * *